(12) United States Patent
Masaki

(10) Patent No.: US 6,373,589 B2
(45) Date of Patent: *Apr. 16, 2002

(54) DATA READ APPARATUS, METHOD, AND PRINTING APPARATUS

(75) Inventor: Tomoaki Masaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,344

(22) Filed: Feb. 24, 1998

(30) Foreign Application Priority Data

Feb. 27, 1997 (JP) .............................. 9-043870

(51) Int. Cl.$^7$ ............................. G06F 15/00; H04N 1/04
(52) U.S. Cl. ...................... 358/1.17; 358/1.18; 358/474
(58) Field of Search ................................ 358/474, 475, 358/486, 488, 494, 596, 261.1, 261.3, 1.1, 1.2, 1.3, 1.5, 1.9, 1.11

(56) References Cited

U.S. PATENT DOCUMENTS

| | | | | |
|---|---|---|---|---|
| 4,196,986 A | * | 4/1980 | Moyroud | 354/15 |
| 4,566,038 A | * | 1/1986 | Dimick | 358/261.1 |
| 5,049,897 A | * | 9/1991 | Ng | 346/1.1 |
| 5,329,629 A | * | 7/1994 | Horst et al. | 395/425 |
| 5,349,566 A | * | 9/1994 | Merritt et al. | 365/233.5 |
| 5,511,152 A | | 4/1996 | Lai et al. | 395/115 |
| 5,638,100 A | * | 6/1997 | Kanematsu et al. | 347/35 |
| 5,729,503 A | * | 3/1998 | Manning | 365/233.5 |
| 5,963,504 A | * | 10/1999 | Manning | 365/233.5 |
| 5,966,724 A | * | 10/1999 | Ryan | 711/105 |

OTHER PUBLICATIONS

Patent Abstracts of Japan, vol. 017, No. 677 (P–1659), Dec. 13, 1993 & JP 05 225122 A (Sony Corp).

* cited by examiner

*Primary Examiner*—Madeleine Nguyen
(74) *Attorney, Agent, or Firm*—Fitzpatrick, Cella, Harper & Scinto

(57) ABSTRACT

An apparatus, having a simple configuration capable of reading data from DRAM in hyper-page mode at high speed. When a change in row address is detected while reading the data, storing of data read after the detection and changing of address are prohibited, and the read data is discarded. When the number of accesses has reached a predetermined number, the processing is terminated. When necessary data have not been stored, the row address is changed, and remaining data to be read is read in the hyper-page mode. Further, when it is determined that the necessary data have been stored before the number of accesses reaches the predetermined number, setting of data read thereafter is prohibited, as well as changing of address is also prohibited, thereby discarding the read data.

6 Claims, 6 Drawing Sheets

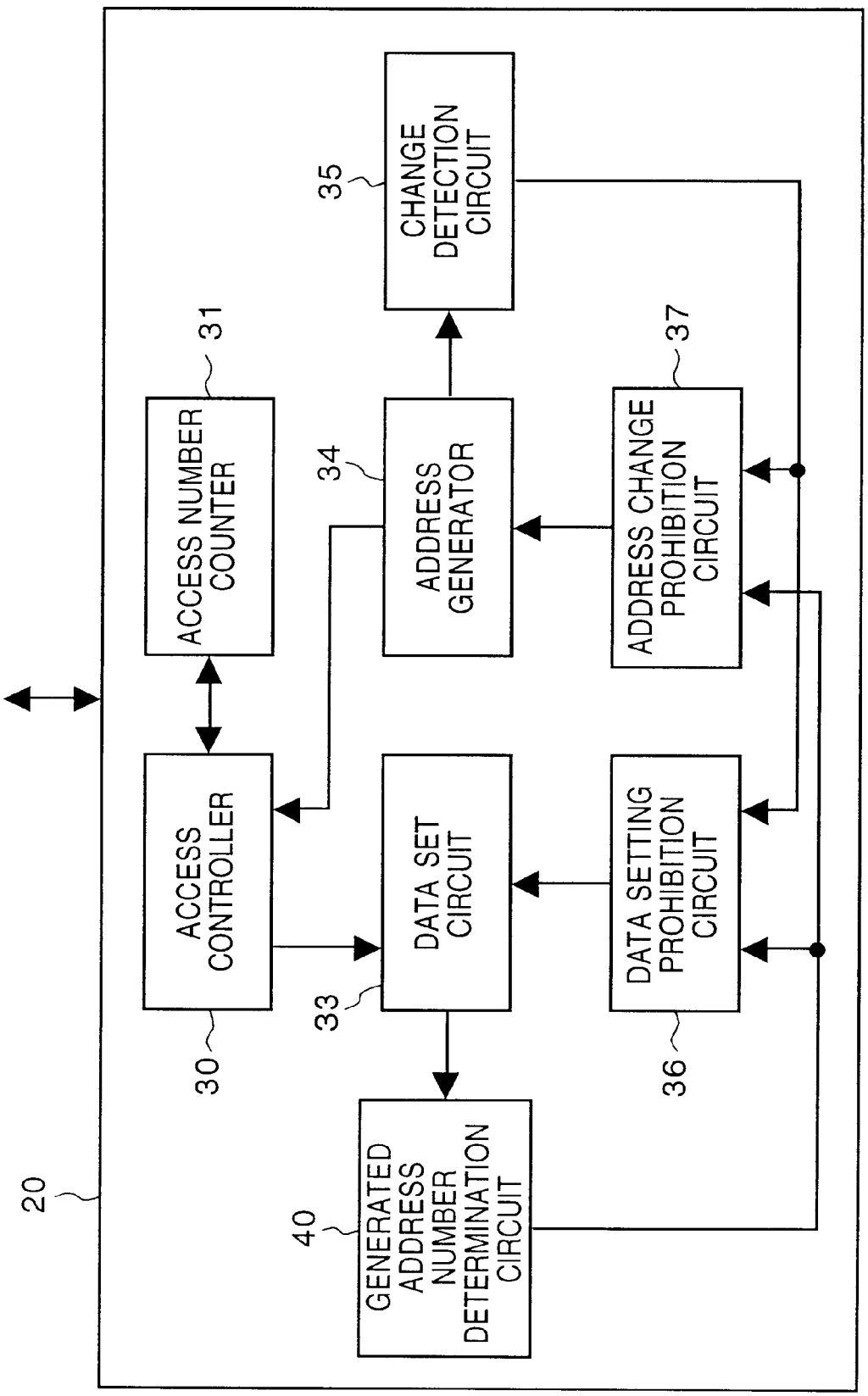

DATA READ APPARATUS, METHOD, AND PRINTING APPARATUS

BACKGROUND OF THE INVENTION

The present invention relates to a data read apparatus and method capable of reading a variety of data which is stored in a buffer configured with DRAM and necessary for recording, and a printing apparatus.

Recently, as the print speed and dot density produced by printing apparatus when printing characters have increased, the amount of print data read from a print buffer of a printing apparatus per unit time has also increased. For this reason, it becomes necessary to access DRAM configuring the print buffer at high speed. One method for realizing high-speed access DRAM is a hyper-page mode access. Generally, the memory location of DRAM to be accessed is specified by a row address and a column address based on an address generated by, e.g., a CPU. The hyper-page mode is for realizing the high-speed reading and writing of data from/to DRAM by fixing the row address while changing the column address of the DRAM at high speed. In a case of accessing a print buffer configured with DRAM in the hyper-page mode, data can be continuously read as long as the row address does not change. Therefore, it is possible to continuously access a print buffer to read the necessary number of data (n data) when all the n data are stored at the same row address locations. However, in a case where the row address changes during reading of the n data, x number of data (x data) are continuously read before the row address changes. Thereafter, the row address is changed and the rest of the n data (n–x data) are read.

However, in the hyper-page mode for accessing DRAM at high speed, when a changing point of row address is found while accessing of the DRAM, it is not possible to stop accessing DRAM immediately. Accordingly, in a case where the row address has to be changed while reading the n data in the hyper-page mode, it is necessary to determine timing to issue a request for terminating the access in the current row in consideration of the addresses (unnecessarily read addresses) to which the access has proceeded before the access to the DRAM is actually stopped once the termination of access is requested. Therefore, a processing circuit for determining the changing point of row address is necessary. Furthermore, in a case where the number of addresses between an address where access starts and a changing point of row address is equal or less than the number of unnecessarily read addresses, it is even impossible to start accessing in the hyper-page mode, and thus access to DRAM has to be performed in normal mode, which makes the processing complicated.

There is a method for determining an access pattern by finding a changing point of the row address before starting accessing DRAM. In such cases, it is necessary to find the changing point of row address by sequentially comparing all the addresses to be accessed by a pair of addresses generated successively in advance, which requires an extra circuit and a long processing time. When reading the n data, a possible changing point of row address is at one of (n−1) points at maximum. Therefore, in a case where the row address changes at most one time while reading the n data, there are n different access patterns depending upon the position of a changing point, which requires n types of controllers corresponding to the number of the access patterns.

SUMMARY OF THE INVENTION

The present invention has been made in consideration of the above situation, and has as its object to simplify necessary processes while accessing of DRAM by omitting control for determining row address change during accessing DRAM and terminating the access, and control for determining a changing point of row address before starting accessing the DRAM and selecting an access pattern depending upon the determination result, further, omitting a circuit which was necessary for processes performed before starting accessing the DRAM, and circuits which were necessary for complicated control during processing time and during accessing the DRAM.

According to the present invention, the foregoing object is attained by providing a data read apparatus for reading data from memory of which location to be accessed is specified by a row address and a column address on the basis of a designated address. In one embodiment, a reading means reads a predetermined number of data by changing the column address while fixing the row address, starting from a designated start address of the memory. If a location to be read has a change in row address, that fact is detected. A storage means is provided for storing data read by the reading means until either a change in row address is detected or the number of stored data reaches the predetermined number. In a case where the change in row address is detected, an address whose row address is changed is used as the start address, and reading of data by the reading means and storing of the read data to the storage means are repeated.

Further, the foregoing object is also attained by providing a similar data read method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram illustrating another detailed configuration of the RAM access controller.

DETAILED DESCRIPTION OF THE PREFERRED EMBODIMENTS

Preferred embodiments of the present invention will be described in detail in accordance with the accompanying drawings.

<First Embodiment>

Figure 1:
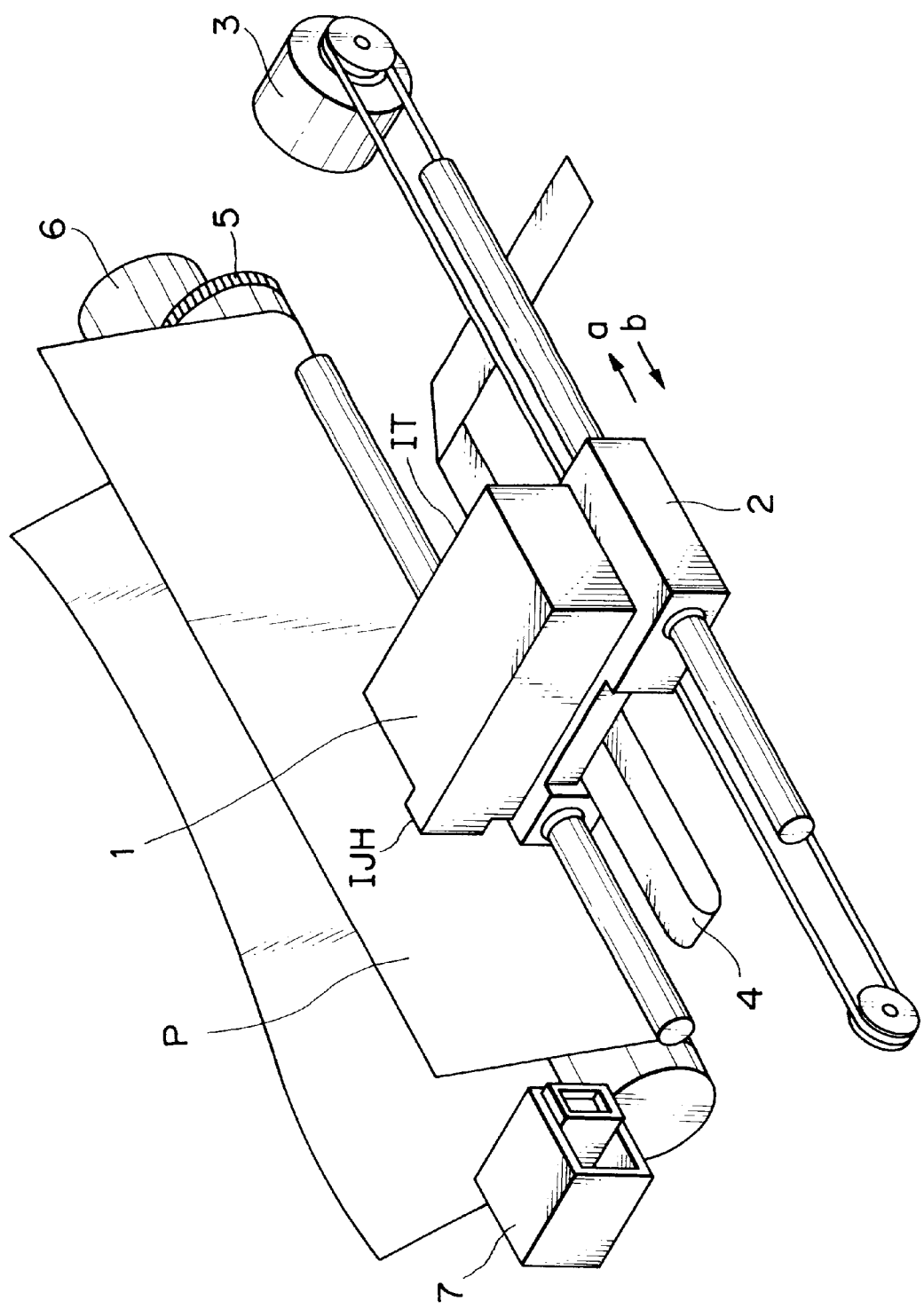
FIG. 1 is a view showing an external configuration of an ink-jet printing apparatus.

FIG. 1 is a view showing an external configuration of a main portion of an ink-jet printing apparatus according to a first embodiment of the present invention.

Figure 2:
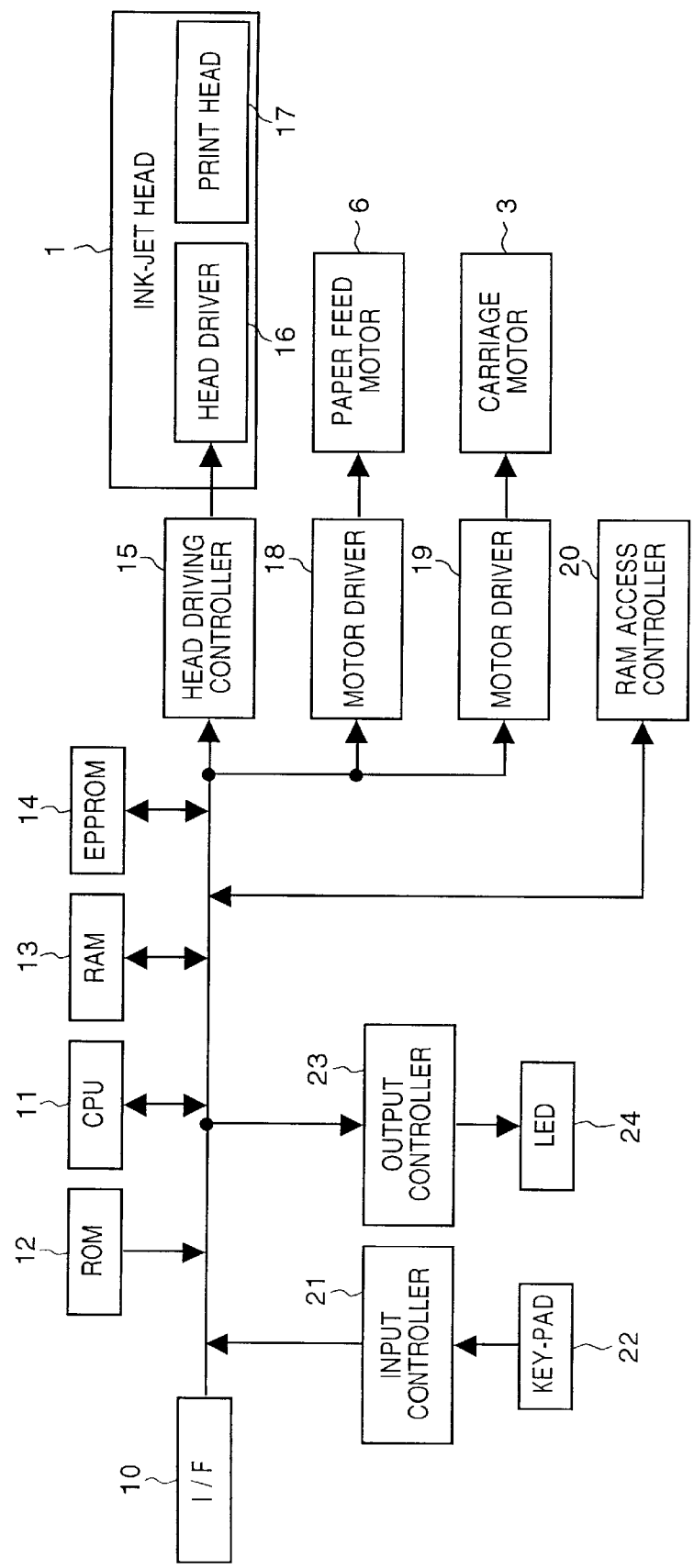
FIG. 2 is a block diagram illustrating a configuration of a printing apparatus.

Referring to FIG. 1, a carriage 2 is reciprocally moved in the directions of arrows a and b in FIG. 1, coupled with the forward and reverse rotation of a carriage motor 3. An integrated ink-jet cartridge 1 which incorporates a printing head IJH and an ink tank IT is mounted on the carriage 2. The ink-jet cartridge 1 is connected to a control unit, which is shown in FIG. 2, by a cable 4, and discharges an ink droplet in synchronization with the reciprocal scanning operation of the carriage 2, thereby records an image on a recording paper sheet P. The recording paper sheet P is pressed against a platen 5 by a pressing plate (not shown), and conveyed in the direction which is orthogonal to the moving direction of the carriage 2, by rotation of the platen 5 driven by a paper feed motor 6. Reference numeral 7 denotes a cleaning unit which sucks residual ink from the head IJH which is moved to the position in front of the cleaning unit 7 after completing printing.

FIG. 2 is a block diagram illustrating the configuration of a control unit of the printing apparatus shown in FIG. 1.

The printing apparatus is connected to a host apparatus, which is the print information source, via an interface circuit 10 and receives print data from the host apparatus. The received print data is developed into image data when necessary, and stored in RAM 13. Including these controls, the overall control of the printing apparatus is realized by executing a program, stored in ROM 12 or EEPROM 14, by a CPU 11.

The image data (print data) stored in the RAM 13 is read out under control of a RAM access controller 20, and transmitted to a head driving controller 15. The head driving controller 15 transmits the print data to the ink-jet head 1 as a video signal.

Further, the paper feed motor 6 and the carriage motor 3 are operated by motor drivers 18 and 19 in synchronization with the transmission of the print data, thereby scanning by the carriage 2 and the conveyance of a paper sheet are performed.

In addition, a key-pad 22 is provided via an input controller 21 for an operator to designate various settings to the printing apparatus. Further, in order to display the state of the printing apparatus, an LED 24 is provided via an output controller 23.

Figure 3:
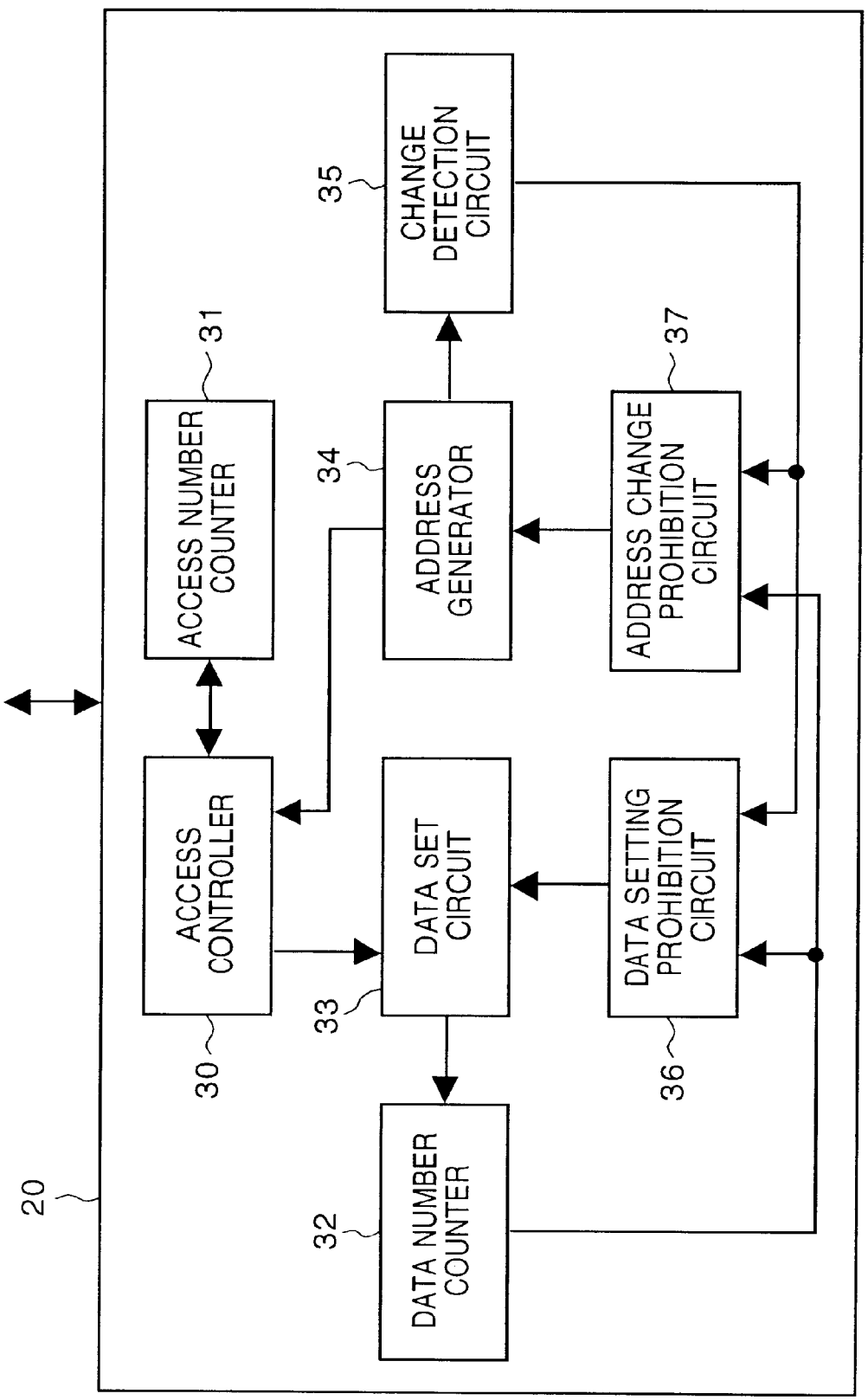
FIG. 3 is a block diagram illustrating a detailed configuration of a RAM access controller.

FIG. 3 is a block diagram illustrating a detailed configuration of the RAM access controller 20 shown in the block diagram in FIG. 2. A control of the RAM access controller 20, when it is realized as a hardware circuit, is explained below with reference to FIG. 3.

Referring to FIG. 3, an access controller 30 controls DRAM access performed in the hyper-page mode. An address to be accessed is provided from an address generator 34, and data read at the address is sent to a data set circuit 33. The number of accesses in the hyper-page mode is counted by an access number counter 31. A change in row address is detected by a change detection circuit 35, and, when a change in row address is detected, the setting of data read from the DRAM at the subsequent addresses is prohibited by a data setting prohibition circuit 36. Further, to change addresses thereafter is also prohibited by an address change prohibition circuit 37. Then, when the number of accesses in the hyper-page mode reaches a predetermined number, the accessing processing is completed. However, if the necessary data have not been set at this time, access in the hyper-page mode starts again, and the subsequent data is read from the DRAM.

Further, in a case where a data number counter 32 determines that the necessary data is set before the number of accesses in the hyper-page mode reaches the predetermined number, the data setting prohibition circuit 36 prohibits the setting of data thereafter, further the address change prohibition circuit 37 prohibits to change addresses thereafter. Then, after the number of accesses in the hyper-page mode reaches the predetermined number, the processing is terminated.

Note that, if the change detection circuit 35 detects a change in row address, the data setting prohibition circuit 36 prohibits the setting of data read at addresses after the change in row address is detected. Further, when the data number counter 32 determines that the number of set data has reached the necessary number, the data setting prohibition circuit 36 prohibits the setting of data thereafter.

Figure 4:
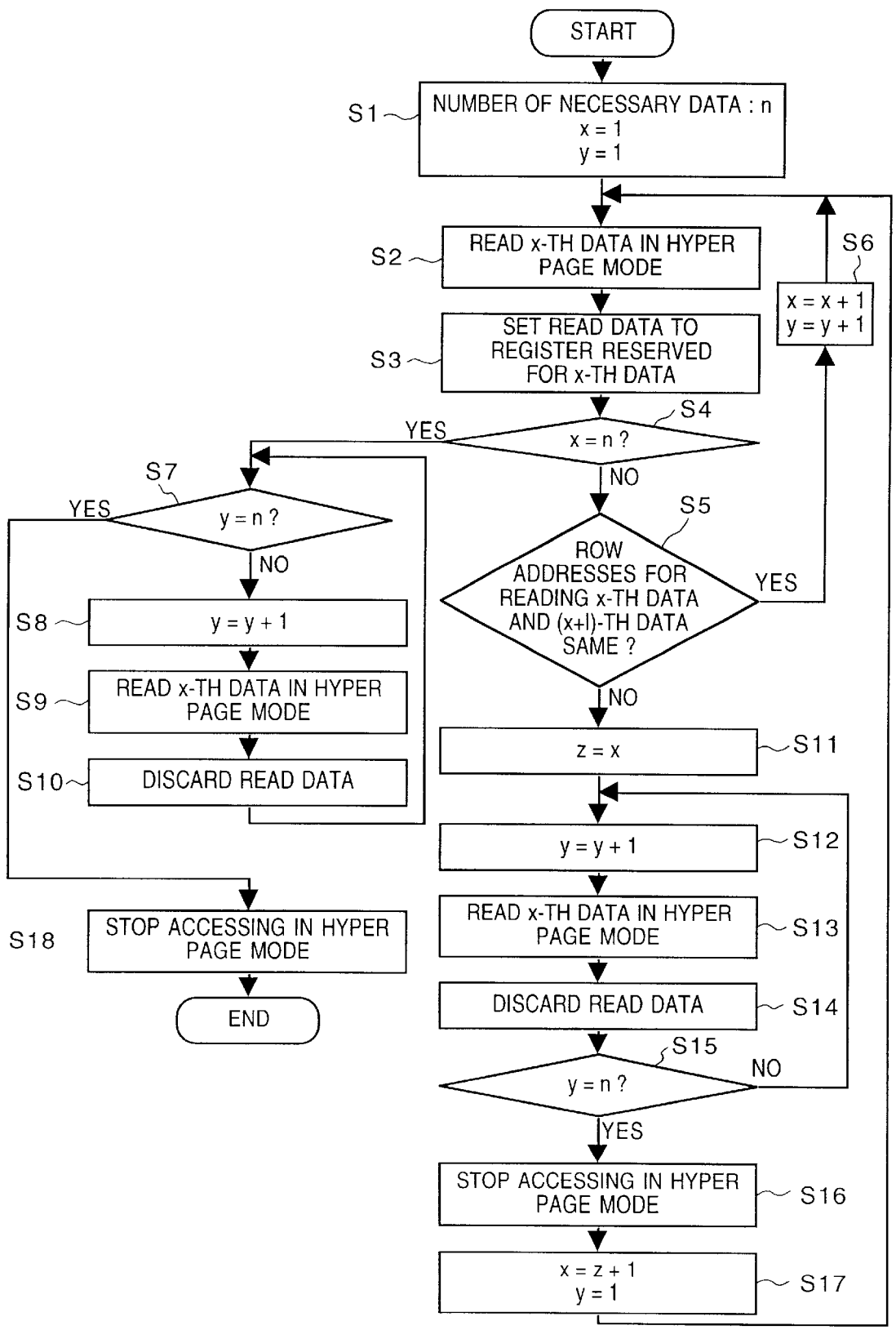
FIG. 4 is a flowchart of an operational sequence for reading memory in hyper-page mode according to a first embodiment.

FIG. 4 is a flowchart showing a memory read routine performed by the RAM access controller 20 in the hyper-page mode.

Below, a routine for reading a print buffer configured with DRAM is explained with reference to FIG. 4.

When the print buffer start being read in step S1, the number of necessary data, n, as an initial value, is set, further, a variable x (the number of set data) and a variable y (the number of accesses in the hyper-page mode) are set to 1.

Then, access in the hyper-page mode starts in step S2, and the first data, namely data at an address determined by a designated row address and the first column address of the data to be read, is read. Next, in step S3, the read first data is set to a register reserved for storing the first data. Thereafter, the process proceeds to step S4 where whether or not the number of necessary data (n) have been read is determined. If not, the process proceeds to step S5, where it is determined whether the row address of a memory location where data to be read next is stored is the same as the row address of a memory location where the data read previously is stored.

If they are identical, then the process proceeds to step S6 where the values of the variables x and y are increased, and the process returns to step S2, the column address is increased and the second data is read, and the read data is set in the second register in step S3.

In a case where the row address does not change while reading the n data, processes in steps S2 to S6 are repeated (n−1) times, and further, the n-th data is read in step S2 and set in the n-th register in step S3. Thereafter, the process proceeds to step S4. Since the variable x is equal to n, here (that is, the n data have been read), the process proceeds to step S7, where whether or not the number of accesses (y) in the hyper-page mode reaches n times is determined. In this case, it should be determined that the number of accesses has reached n times, and therefore, the process proceeds to step S18 and the access in the hyper-page mode is completed. Note, the number of accesses (y) to memory for reading data in the hyper-page mode is referred to as "READ number (y)" hereinafter.

In a case where the row address changes while reading the n data, the processes in steps S2 to S6 are repeated until the change in row address is found in step S5. When the change in row address is found in step S5, the process proceeds to step S11, and the number of set data (x) is copied to a variable z. Then in step S12, the value of the variable y is increased by one, and data at the address which is not changed, namely, data at the same address, is read again in step S13. The read data is discarded in step S14. More specifically, the read data is not set in a register. Then, in step S15, steps S12 to S15 are repeated until the variable y becomes to n (that is, the READ number (y) becomes equal to n times). When the variable y becomes n, the process proceeds to step S16 where the access in the hyper-page mode is completed.

Then in step S17, the set number of set data (x) is restored from the variable z as an initial value for the next hyper-page mode access and increased, and the READ number (y) is reset to 1. Thereafter, the process returns to step S2 where the row address and the column address are set based on the "next" address which was compared with the "previous" address in the last process in step S5, and access in the hyper-page mode is initiated. Then, steps S2 to S6 are repeated.

If the row address changes again before the number of set data (x) reaches the number of necessary data (n) while repeating the processes in steps S2 to S6, the processes in steps S11 to S17 are repeated, then the process returns to step S2. Whereas, if the row address does not change until the number of set data (x) reaches the number of necessary data (n), the process proceeds from step S4 to step S7. In this case, since the value of the variable y has not reached n, yet, the process proceeds to step S8 where the variable y is increased by one, and the data stored at the same address as that where the n-th data is read in step S9. The read data is discarded in step S10, and the process returns to step S7. Then, steps S7 to S10 are repeated until the READ number (y) becomes n in step S7, and when y becomes equal to n, the process proceeds to step S18 where the access in the hyper-page mode is completed.

Using the aforesaid configuration and method, it is possible to access addresses where stored data can be read in the hyper-page mode. Since the access is not terminated or access mode is not changed even a change in row address is found, the control sequence is simplified, thereby simplifying a circuit for realizing the control sequence.

Note, in the aforesaid control sequence, discarded data in the processing is identical to previously read data. However, since the data is discarded, any data stored at any address may be read.

Further, in the aforesaid control sequence, the reading of data in the hyper-page mode is repeated until the READ number (y) becomes equal to the number of necessary data (n). However, the present invention is not limited to this, and the READ number (y) can be controlled in accordance with an arbitrary value.

<Second Embodiment>

In the first embodiment, the reading of data, even if read data it is to be discarded, is continued until the READ number (y) reaches the number of necessary data (n). In the second embodiment, during the reading of data which is to be discarded, preparation for terminating the access in the hyper-page mode is performed, and whenever the termination of the access becomes ready, the access in the hyper-page mode is terminated. In other words, it is possible to terminate the access in the hyper-page mode even though the READ number (y) has not reached the number of necessary data (n), thus time which elapses during performing unnecessary access can be shortened.

Figure 5:
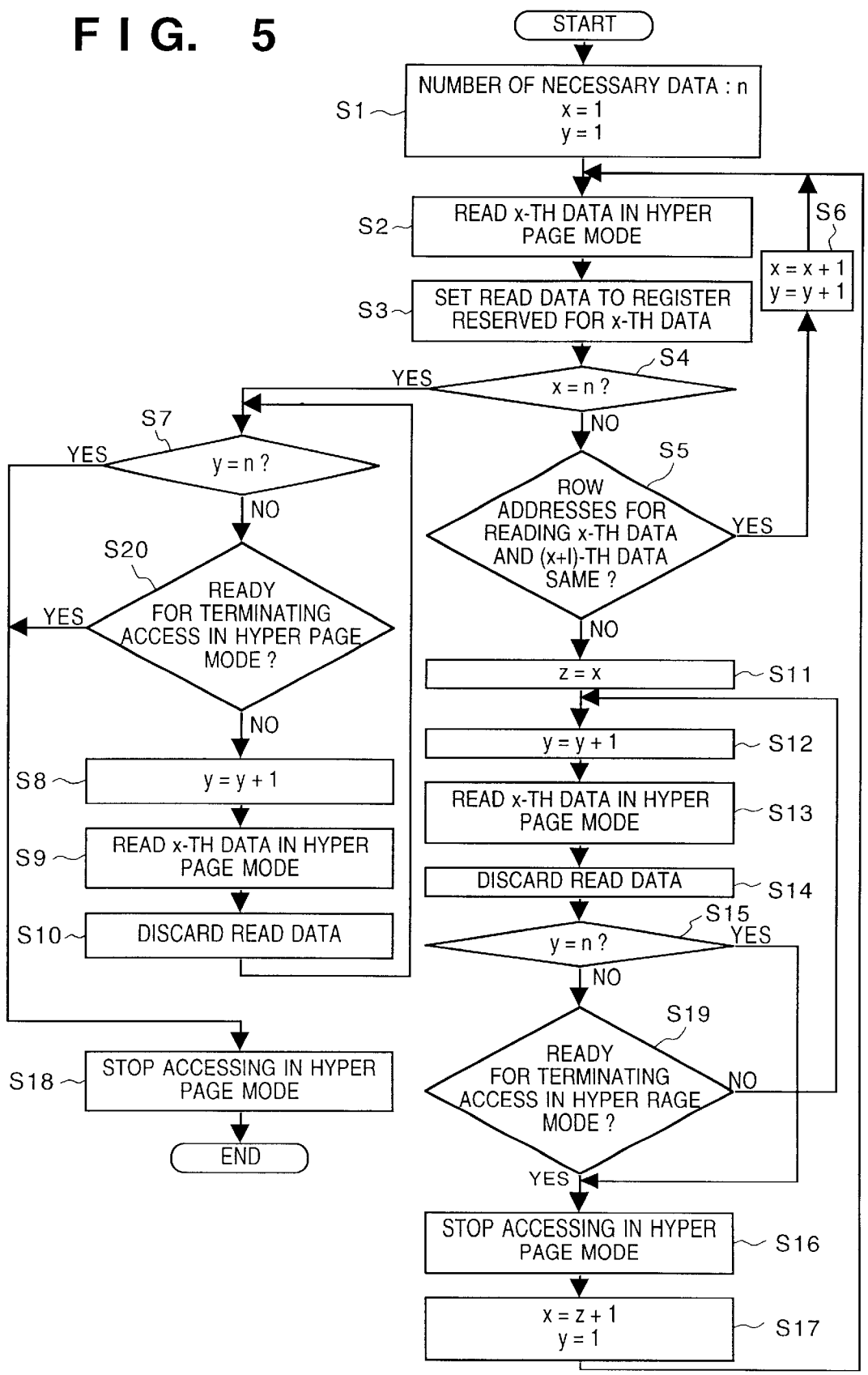
FIG. 5 is a flowchart of operational sequence for reading memory in hyper-page mode according to a second embodiment.

Referring to FIG. 5, the second embodiment, mainly the difference between the second embodiment and the first embodiment, is explained is explained below.

The processing when the row address does not change until the n number of data have been read is the same as that shown in FIG. 4, therefore, the explanation of the processing is omitted.

Next, a case where the row address changes before the n number of data have been read is explained. When a change in row address is found in step S5, the processing in step S11 and its subsequent steps are performed. While performing processes of discarding data, preparation for terminating the access in the hyper-page mode is started before the READ number (y) reaches the number of necessary data (n). Then, when it is ready for terminating the access in the hyper-page mode, the process proceeds from step S19 to S16 where the access in the hyper-page mode is terminated. Further, in step S4, when the READ number (y) has not reached the number of necessary data (n) after completing the access for reading the necessary data, the read data is also discarded thereafter. While performing this processes, preparation for terminating the access in the hyper page mode is started. Then, when it is ready for terminating the access in the hyper-page mode, the process proceeds from step S20 to step S18 where the access in the hyper page mode is terminated.

According to the second embodiment as described above, by terminating the access right after the preparation for termination of the access to memory in the hyper-page mode is ready, it is possible to stop unnecessary access earlier than the case described in the first embodiment.

<Third Embodiment>

In the configuration shown in FIG. 3 according to the first embodiment, to change an address and the setting of data are prohibited when the set number of data has reached the number of necessary data. In the third embodiment, to change an address is prohibited when the generated number of addresses used for reading data from the DRAM has reached the number of access for necessary data. Then, coupled with the prohibition against the changing of address, the setting of data at the corresponding address is prohibited.

Accordingly, in the third embodiment, a configuration shown in FIG. 6 is used instead of the configuration shown in FIG. 3. In FIG. 6, instead of the data number counter 32, a generated address number determination circuit 40 is provided.

Referring to FIG. 6, when a change in row address is detected by the change detection circuit 35, the setting of data read from the DRAM at the subsequent addresses is prohibited by the data setting prohibition circuit 36. Further, when the generated address number determination circuit 40 determines that the number of generated addresses reaches the number of memory accesses requested, the data setting prohibition circuit 36 prohibits the setting of data read from the DRAM at the subsequent addresses, similarly to the case where the data number counter 32 determines that the number of set data reached the number of necessary data.

For example, when there is a time gap between when an address is outputted and when read data is set, in other words, in a case where the next address is to be generated or outputted before completing setting of data read at the previous address, time for prohibiting a address change is different from time for prohibiting the setting of data, the aforesaid consideration is necessary.

The present invention can be applied to a system constituted by a plurality of devices (e.g., host computer, interface, reader, printer) or to an apparatus comprising a single device (e.g., copying machine, facsimile machine) as long as the system or the device has DRAM.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in memory provided in a function expansion unit which is connected to the computer, CPU or the like contained in the function expansion card or unit performs a part or entire process in accordance with designations of the program codes and realizes functions of the above embodiments.

According to the present invention as described above, whether an address used for accessing is effective or not is determined, and whether the read data read at the address is to be kept or discarded is controlled depending upon the above determination. Thereby, processing before starting accessing is unnecessary and processing during the access is simplified.

The present invention is not limited to the above embodiments and various changes and modifications can be made within the spirit and scope of the present invention. Therefore to apprise the public of the scope of the present invention, the following claims are made.

What is claimed is:

1. A method for accessing memory, comprising the steps of:
    reading x-th data from memory in a hyper-page mode;
    setting the read data to an x-th register;
    determining whether or not N number of data have been read;
    terminating the memory access in the hyper-page mode if it is determined that the N number of data have been read;
    determining whether or not a row address has changed if it is determined that the N number of data have not been read;
    repeating the steps from said reading step after incrementing the value x for the next data if it is determined that the row address has not changed; and
    if it is determined that the row address has changed, saving value x, reading and discarding data, and when the N number of data have been read, terminating the memory access in the hyper-page mode and repeating the steps from said reading step after incrementing the saved value x for the next data.

2. A memory access apparatus comprising:
    first means arranged to read x-th data from memory in a hyper-page mode, set the read data to an x-th register, determine whether or not N number of data have been read, terminate the memory access in the hyper-page mode if it is determined that the N number of data have been read, and determine whether or not a row address has changed if it is determined that the N number of data have not been read; and
    second means arranged to, if it is determined that the row address has not changed, repeat processing from the reading processing of said first means after incrementing the value x for the next data, whereas if it is determined that the row address has changed, save value x, read and discard data, and when the N number of data have been read, terminate the memory access in the hyper-page mode and repeating processing from the reading processing of said first means after incrementing the saved value x for the next data.

3. A printer comprising:
    a memory access circuit including:
        first means arranged to read x-th data from memory in a hyper-page mode, set the read data to an x-th register, determine whether or not N number of data have been read, terminate the memory access in the hyper-page mode if it is determined that the N number of data have been read, and determine whether or not a row address has changed if it is determined that the N number of data have not been read; and
        second means arranged to, if it is determined that the row address has not changed, repeat processing from the reading processing of said first means after incrementing the value x for the next data, whereas if it is determined that the row address has changed, save value x, read and discard data, and when the N number of data have been read, terminate the memory access in the hyper-page mode and repeating processing from the reading processing of said the first means after incrementing the saved value x for the next data; and
    a printing unit arranged to perform printing based upon data read by said memory access circuit.

4. A printer according to claim 3, wherein said printer includes a head driving circuit and a head, and wherein the head driving circuit transfers data read by the memory access circuit to the head and the head performs printing according to the data transferred by the head driving circuit.

5. A printer according to claim 4, wherein the head is an ink-jet head.

6. An apparatus for performing a continuous access to data having a predetermined length stored in a memory by fixing a row address while changing a column address in a first mode, said apparatus comprising:
    a change detection circuit adapted to determine whether the row address of a next memory location where data to be read next is stored is the same as the row address of a previous memory location where the data read previously is stored; and
    an access circuit adapted to read data from the next memory location and set the data so read to a register as long as the continuous access to the data having the predetermined length is not finished and the row address of the next memory location is the same as the row address of the previous memory location,
    wherein said access circuit is adapted to read data from the next memory location and discard data read by said access circuit until the continuous access to the data having the predetermined length is finished in a case where the row address of the next memory location is not the same as the row address of the previous memory location,
    wherein said access circuit reads data again from a memory location where the row address of the memory location is not the same as the row address of the previous memory location in the first mode in a case where said access circuit has discarded read data.

* * * * *

UNITED STATES PATENT AND TRADEMARK OFFICE
CERTIFICATE OF CORRECTION

PATENT NO.      : 6,373,589 B2
DATED           : April 16, 2002
INVENTOR(S)     : Tomoaki Masaki It is certified that error appears in the above-identified patent and that said Letters Patent is hereby corrected as shown below:

Title page,
Item [56], References Cited, before OTHER PUBLICATONS, insert
-- FOREIGN PATENT DOCUMENTS
EP 501 621 A2  2/1992 --.

Column 4,
Line 20, "start" should read -- starts --.

Column 5,
Line 1, "to" should be deleted.

Signed and Sealed this

Twenty-second Day of July, 2003

JAMES E. ROGAN
*Director of the United States Patent and Trademark Office*